COLLAPSIBLE ROD

Original Filed June 8, 1971 2 Sheets-Sheet 1

COLLAPSIBLE ROD

Original Filed June 8, 1971 2 Sheets-Sheet 2

United States Patent Office

Re. 28,067
Reissued July 9, 1974

28,067
COLLAPSIBLE ROD

Joseph Hyman, Newton Center, Mass., assignor to Hycor, Inc., Woburn, Mass.

Original No. 3,669,133, dated June 13, 1972, Ser. No. 44,239, June 8, 1971. Application for reissue Feb. 26, 1973, Ser. No. 335,717
Int. Cl. A45b 9/00
U.S. Cl. 135—15 PQ 16 Claims

Matter enclosed in heavy brackets [ ] appears in the original patent but forms no part of this reissue specification; matter printed in italics indicates the additions made by reissue.

ABSTRACT OF THE DISCLOSURE

A collapsible rod structure adopted to be used as a cane, the structure comprises a plurality of tubular sections tethered together by a cord and separable to form a compact bundle.

This invention relates to extensible and collapsible rod structures and more particularly to a novel cane or walking stick that has a sectional structure and is collapsible to form a compact portable bundle.

The primary object of this invention is to provide a new and improved sectional rod or pole that is useable as a cane or walking stick.

A further object is to provide a novel rod or pole made up of a plurality of tubular sections which are tethered together by a flexible cable or cord so as to be separable to permit folding into a compact bundle and are designed so as to automatically interlock in telescoping fashion to form an elongate rigid structure.

Another object is to provide a rod or pole of sectional construction that is made up of essentially like tubular members.

Still another object is to provide a self-erecting rod or pole that is useable as a cane or walking stick and comprises a plurality of tubular members with ends that provide maximum surface to surface contact when the members are interlocked, with the result that the erected structure is rigid.

The foregoing and other objects are achieved by means of a plurality of tubular members that are strung or tethered together by a flexible cable. The tubular members are of identical diameter and are formed with a taper at one end and a flared enlargement at the opposite end, the taper and flare being designed according to the wall thickness of the members to facilitate automatic seating of the tapered end of one member in the flared end of another member and to provide maximum surface to surface engagement between members. In one embodiment the cable is not extensible and a mechanism is provided at one end for drawing the cable taut and thereby causing the tubular members to be brought into interlocking relation with one another. In another embodiment an elastic cable is used to draw the tubular members together.

Other features and many of the attendant advantages of the invention are described or rendered obvious by the following detailed description which is to be considered together with the accompanying drawings wherein.

Figure 1:
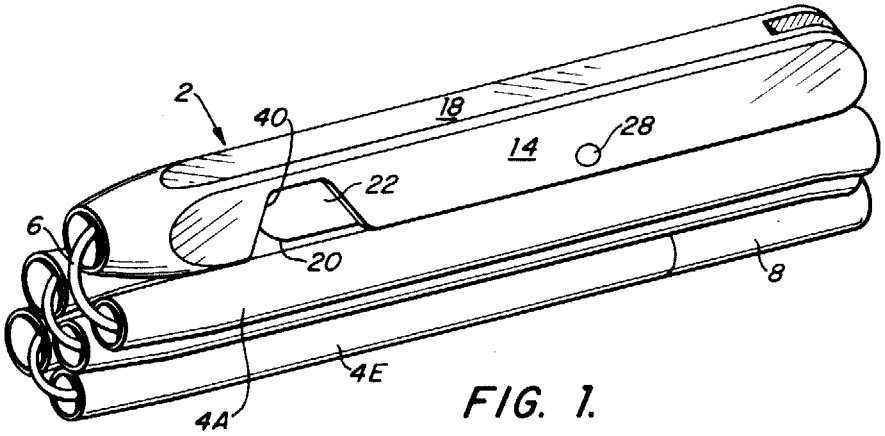
FIG. 1 shows a cane constituting a preferred embodiment of invention in folded condition.

Referring now to FIGS. 1–5, the illustrated cane comprises a handle 2, five tubular sections 4A, 4B, 4C, 4D and 4E and a flexible non-stretchable cord 6. Preferably the cord 6 is a metal cable. One end of tubular member 4E is fitted with a tip member 8.

The handle 2 is an elongate body sized to be conveniently gripped by the user's hand and may be made of any suitable material such as a metal or metal alloy (e.g. steel or aluminum) or a stiff plastic or a hard rubber composition. The handle comprises a solid portion that extends from the end adjacent to tubular section 4A and terminates at 12; the remaining portion of the body comprises a U-shaped channel defined by side walls 14 and 16 and a connecting wall 18. Mounted in the channel is a toggle lever 20 which preferably is made of the same material as the handle. Toggle lever 20 also is a U-shaped channel, comprising side walls 22 and 24 and a connecting wall 26. One end of lever 20 is pivotally secured to the handle by two rivet studs 28 and 38 mounted as shown in FIG. 3A. The other end of lever 20 carries a pin 32 which is anchored in its side walls 22 and 24.

The cord 6 is provided with a loop 34 whereby it is anchored to pin 32 of lever 20 and extends through a bore 36 and a tapered hole 38 in the solid portion of handle 2. The hole 38 is tapered to snugly receive the adjacent tapered end of tubular section 4A. The side walls 14 and 16 of the handle are notched as at 40 to permit the user to grasp the sides of lever 20 when the latter is in its forward position. Additionally the side walls 14 and 16 extend beyond the end of top wall 18 of the handle so as to permit the user to press and pivot the lever when it is in its rearward position.

The tubular sections 4A–4D are alike. Preferably they are made of a suitable metal or metal alloy, e.g. steel or aluminum, but they may also be made of a stiff plastic. Each of the sections 4A–4D is made of cylindrical stock, with one end tapered as at 42 and the other flared as at 44. The angle of taper is the same as the angle of flare and the wall thickness of each of the members is the same throuhgout its length. The angle of flaring and tapering is such that the maximum increase and decrease in radius of the flared and tapered ends respectively is approximately the same as the wall thickness of the tubular members. Preferably the angle of tapering and flaring is about 5 degrees measured with respect to the longitudinal axis. This assures maximum area of contact between the tubular sections coupled with ease of entry of the tapered end of one section into the flared end of another section. The hole 38 has the same taper as the tapered ends of sections 4A–4D.

The tubular section 4E is tapered at one end in the same manner and preferably is made of the same material as the other tubular sections. The opposite end of tubular section 4E is not flared. The tip member 8 may be made of metal but preferably it is made of a plastic such as nylon or high density polyethylene or propylene which will mar floors or furniture but is durable and long wearing. The tip member is a solid body and has a reduced diameter at one end so as to make a tight press fit inside of tubular member 4E. Secured in the reduced diameter end of tip member 8 is an eyebolt 46 to which the end of cord 6 is secured.

Figure 4:
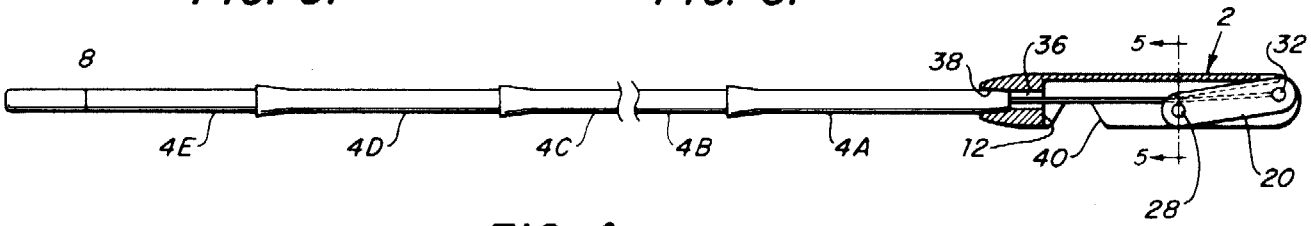
FIG. 4 shows the same cane in extended or assembled condition.

When the lever 20 is in the forward position (see FIGS. 1 and 2), there is sufficient slack in the cord 6 to allow the several tubular members to be separated one from the other and the whole assembly of tubular members to be folded into a compact bundle (as in FIG. 1) which may be maintained by insertion into a suitable sheath such as a plastic bag or slevve. When the user wishes to erect the cane, he removes the bundle from its sheath and pulls the lever 20 back into its rearward position (see FIG. 4). As the lever is pivoted it draws up the slack in the cord and this in turn causes unbundling of the several tubular members followed by their being drawn into telescoping interlocking relation with each other and the handle 2. When the lever in its rearward or locking position, the cord 6 is under sufficient tension to hold the tubular members tight against each other with the result that they form a rigid elongate rod or pole. When the lever 20 is pivoted to its rearward position, the pin 32 passes beyond dead center relative to the lever's pivot point, with the results that the portion of the cord extending from pin 32 to bore 36 passes slightly to one side of the pivot axis, i.e., between the pivot axis and the handle wall 18 as shown in FIG. 4. As a result the tension in the cord locks the lever so that it cannot return to its forward position. Since the side walls 14 and 16 extend beyond the connecting wall 18 of the handle, the user has access to the end of the lever to pivot it out of its locked position. Once the user has pivoted the lever back beyond dead center, the tension in the cord will assist him in returning the lever to its forward position, whereupon the tubular sections can be separated and folded into a compact bundle.

Figure 6:
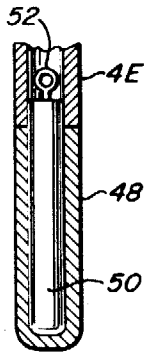
FIG. 6 is a longitudinal sectional view through a modification of the tip end of the same cane.

FIG. 6 shows a modification of the tip member. In this case the tip member comprises a ferrule 48 that preferably is made of a resilient plastic. Mounted within the ferrule by a press fit is a rigid cylindrical plus 50 that may be made of metal or a stiff plastic. The plug 50 is press-fitted in tubular section 4E so as to hold the ferrule securely in place on the end of tubular section 4E. An eyebolt 52 is secured in plug 50 and serves as an anchor for cord 6.

Figure 7:
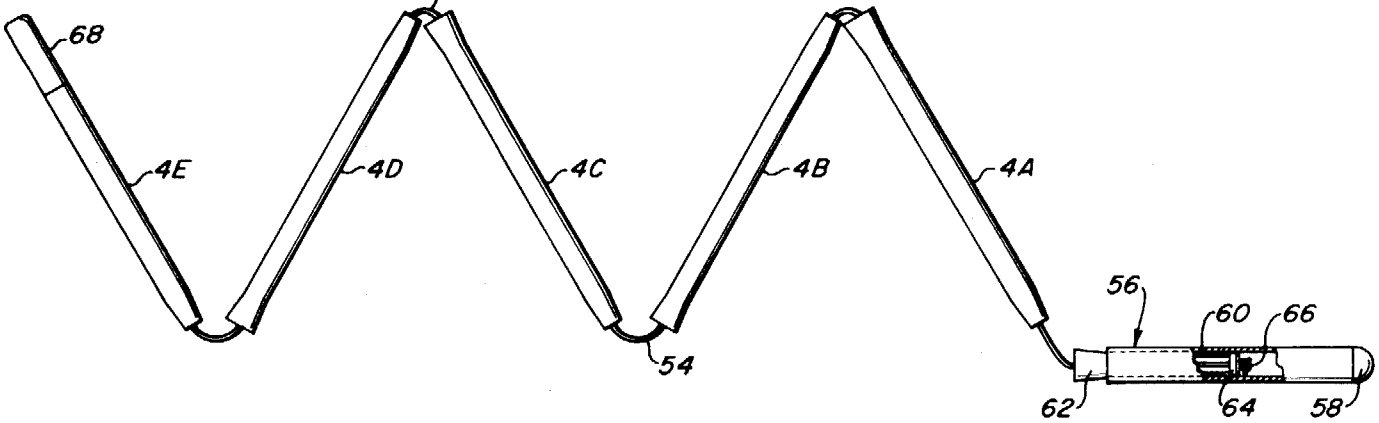
FIG. 7 shows a cane constituting a second embodiment of the invention in partially folded position.

FIG. 7 shows an alternative embodiment of the invention. This embodiment consists of tubular members which are the same (and hence are identified by the same numerals) as tubular members 4A–4E of FIG. 2. It differs from the embodiment of FIGS. 1–5 in two respects. First of all it uses a cord 54 that is elastic. Preferably cord 54 is a rubber cord of the type commonly identified as an exerciser cord, being characterized by a strong spring action. Secondly, it has a tubular handle 56 which which preferably is closed at one end as shown at 58. Press-fitted into the opposite open end of handle 56 is a sleeve 60 which has a flared end 62 projecting from the handle. The flared end 62 is identical in shape and internal diameter as the flared ends of tubular members 4A–4E. The other end of sleeve 62 is closed off by a plug 64 that is secured in place by a press fit or by crimping or by a suitable fastener. The cord 54 extends through sleeve 60 and a hole in plug 54 and is secured in place by means of a knot 66 that is larger than the hole in plug 64.

Figure 2:
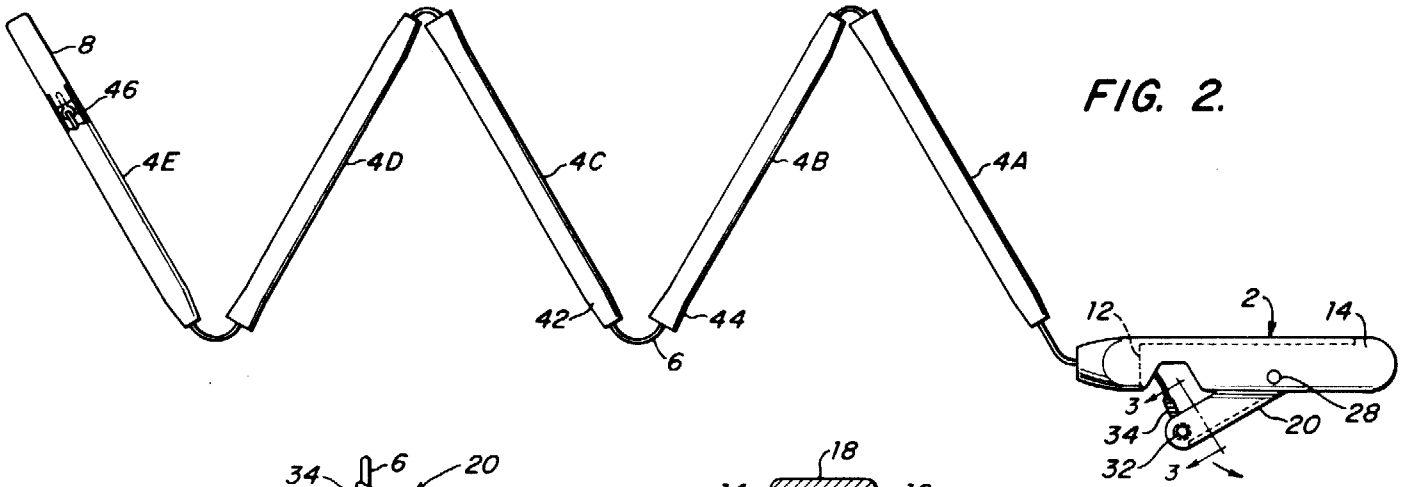
FIG. 2 shows the same cane in partially folded position.
Figure 5:
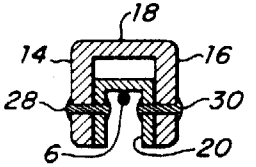
FIG. 5 is a cross-sectional view taken along line 5—5 of FIG. 3.

Attached to the tubular section 4E is a tip member 68 which may be made and secured as shown in FIG. 2 or FIG. 6. The elastic cord 54 is anchored to the tip member like cord 6 in FIG. 2 or in some other suitable manner.

Figure 3:
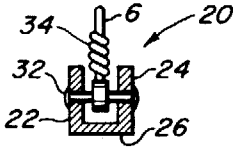
FIG. 3 is a cross-sectional view taken along line 3—3 of FIG. 2.

The embodiment of FIG. 7 offers substantially the same rigidity when erected as the embodiment of FIGS. 1–3, the cord 54 having a length such as to hold the several tubular sections in tight telescoped engagement with each other as is shown in FIG. 3 yet being stretchable enough to permit the sections to be pulled apart manually and articulated into a compact bundle. Because of the tension in the cord, the tubular members must be gripped by hand or some other suitable restraining means in order to maintain them in a bundle similar to that shown in FIG. 1. Assuming that the tubular sections are uncoupled from one another and gripped in a compact bundle similar to that shown in FIG. 1, all that is required to erect the cane is to hold the handle and release the tubular sections. As soon as the tubular sections 4A–4E are released, the elastic cord 54 (being stretched and under tension) will immediately cause the tubular sections to unbundle. As the tubular sections are pulled out of bundled relation to each other, the tapered end of each tubular section will automatically slip into the flared end of the adjacent tubular section (tubular section 4A will slip into the flared end of sleeve 60). This erecting action will occur with the handle oriented in any direction, e.g. up or down.

The two embodiments just described offer several advantages. They are simple and easy to construct. The embodiment of FIG. 7 is easier to erect since all that is required is to hold the handle and release the several tubular members. On the other hand the embodiment of FIGS. 1–3 is easier to collapse since moving lever 20 to its release position introduces sufficient slack into cord 6 to allow the tubular sections to be disconnected and bundled with little effort. Collapsing the unit of FIG. 5 requires stretching the cord 54 enough to disconnect the tubular sections. A further advantage of the two embodiments hereinabove described is that they satisfy the need for a cane or walking stick that can be collapsed into a compact, easy-to-store bundle. Both versions are easily collapsed or extended by blind persons. The invention is also useful for hikers or climbers who need a sturdy but collapsible walking stick.

It is to be noted also that although the illustrated embodiments are canes or walking sticks, the invention is also applicable to construction of self-erecting radio antennas or similar rod or pole-like structures. Of course the invention is not limited to the specific construction shown in the drawings. Thus the handles may be provided with rubber grips or the number, length or diameter of the tubular sections may be varied according to whatever length or diameter is desired. It also is contemplated that the articulated sections 4A–4E may be made solid with only their flared and tapered ends having a tubular construction. It also has been determined that although it is best from the standpoint of cost and ease of erection for the tubular members to have a circular cross-section, it also is possible to use tubular members with a different, e.g. square, cross-section. However, in that case it is necessary to angularly orient the tubular members in order to connect them in telescoped relation to each other.

I claim:

1. A foldable rod comprising first and second end sections and a plurality of tubular sections, each of said tubular sections being flared at one end and tapersed at the opposite end so that said tubular sections may be assembled end-to-end in telescopic engagement with each other, said first end section being tapered at one end to fit in and engage the flared portion of the adjacent tubular section and said second end section having a tapered hole to receive and seat the tapered end of the tubular section adjacent thereto, and a flexible nonstretchable cord for tethering and drawing together said end sections and said tubular sections, said cord extending through said tubular sections lengthwise with one end of said cord being secured within one of said end sections, and means carried by the other end section and connected to the other end of said cord for taking up slack in said cord to draw all of said sections together in end-to-end assembled relation, said last mentioned means comprising a toggle lever pivotally attached to said other end section and means on said toggle lever to which the other end of said cord is received, said toggle lever being movable on its pivot between a first limit position in which said cord is slack and said tubular sections are separable and foldable into a bundle and a second limit position in which the slack in said cord is taken up and said cord is placed under tension sufficient to hold said end sections and tubular sections in said end-to-end assembled relation.

2. A rod accordinng to claim 1 wherein said other end section is adapted to function as a handle so that said rod may be used as a cane.

3. A rod according to claim 1 wherein said other end section has a longitudinally extending slot and said toggle lever is mounted so as to reside in said slot in each of said first and second limit positions.

4. A rod according to claim 3 wherein said cord extends into the interior of said other end section.

5. A rod according to claim 1 wherein said toggle lever has a longitudinally extending channel defined by opposite side walls and a connecting wall, and said cord extends along said channel past the pivot axis of said toggle lever when said lever is in said second position.

6. A rod according to claim 5 wherein said toggle lever is pivotally secured to said other end section by a pair of pivot pins mounted in the opposite side walls of said lever.

7. A rod according to claim 1 wherein each of said tubular sections has the same wall thickness throughout its length.

8. A rod according to claim 1 wherein the angle of taper at said tapered ends is the same as the angle of flare at said flared ends and the increase and decrease in radius at the flared and tapered ends respectively of said tubular sections is approximately the same as the wall thickness thereof.

9. A rod according to claim 1 wherein said tubular sections are identical.

10. A foldable rod comprising first and second end sections, a plurality of tubular sections, and a flexible cord secured at its opposite ends to said first and second end sections and extending through said plurality of tubular sections, said tubular sections each having a flared portion at one end and a tapered portion at the opposite end, the interior and exterior surfaces of said flared and tapered end portions respectively extending at substantially the same angle to the center axis of said tubular sections so that said tubular sections may be assembled end-to-end with the flared portion of one section in telescopic engagement with the tapered portion of another section, the increase and decrease in radius of said tubular sections at said flared and tapered portions respectively being approximately equal to the wall thickness of said tubular sections, one of said end sections being tapered at one end to fit in and seat on the flared end portion of the adjacent tubular section and the other end section having a tapered hole to receive and seat the tapered end portion of the tubular section adjacent thereto, said cord having a length such as to hold said sections together in said end-to-end assembled relation and being elastic so as to permit said sections to be separated and folded together into a compact bundle.

11. A rod according to claim 10 wherein said interior and exterior surfaces of said flared and tapered end portions are inclined at an angle of about 5 degrees relative to said center axis.

12. A rod according to claim 10 wherein each of said plurality of tubular sections has the same wall thickness throughout its length.

13. A rod according to claim 10 wherein each of said tubular sections has the same diameter intermediate its flared and tapered end portions.

14. A foldable rod comprising a plurality of tubular sections of which two are end sections and a flexible elastic cord extending in said tubular sections between anchorage means on said end sections, said tubular sections having interfitting flared and tapered end portions with the angle of flaring and tapering of said flared and tapered end portions respectively being about 5° with respect to the center axis of said sections and the maximum change in radius along said flared and tapered end portions being approximately the same as the wall thickness of said tubular sections, said cord having a length such as to normally hold said sections together in end-to-end interfitting relation and being sufficiently yieldable to permit said sections to be manually separated and folded into a compact bundle.

15. A foldable rod-like structure comprising first and second end sections and a tubular section of substantially uniform wall thickness throughout its length, said tubular section terminating at one end in a flared end portion and at the other end in a tapered end portion, the radius of said flared end portion increasing linearly with increasing distance from said tapered end portion and the radius of said tapered end portion [increasing] *decreasing* linearly with increasing distance from said flared end portion, the maximum difference in radius along each of said flared and tapered end portions not exceeding approximately the wall thickness of said tubular member, said first end section having a tapered hole shaped and sized so as to receive and seat the tapered end portion of said tubular section and said second end section being tapered at one end to fit within and seat on the flared end portion of said tubular section, said sections being assembled end-to-end with said tapered end portion being seated in said tapered hole and said flared end section being seated on said tapered second end section, and an elastic cord extending through said tubular section with one end of said cord anchored within said first end section and the other end of said cord anchored within said second end section, said cord having a length such as to hold said sections together in assembled relation and being sufficiently elastic to permit said sections to be separated and folded together into a compact bundle.

16. A foldable rod according to claim 15 wherein the angles of tapering and flaring of said tapered and flared end portions are each about 5 degrees measured with respect to the longitudinal axis of said tubular section.

References Cited

The following references, cited by the Examiner, are of record in the patented file of this patent or the original patent.

UNITED STATES PATENTS

| | | | |
|---|---|---|---|
| 3,635,233 | 1/1972 | Robertson | 135—47.5 |
| 2,379,577 | 7/1945 | Harsted | 135—45 X |
| 2,705,015 | 3/1955 | Langlais | 135—15 P Q |

J. KARL BELL, Primary Examiner

U.S. Cl. X.R.

135—45 R